C. E. COCHRAN.
INDUSTRIAL TRUCK.
APPLICATION FILED MAR. 8, 1917.
1,275,849.
Patented Aug. 13, 1918.
3 SHEETS—SHEET 1.
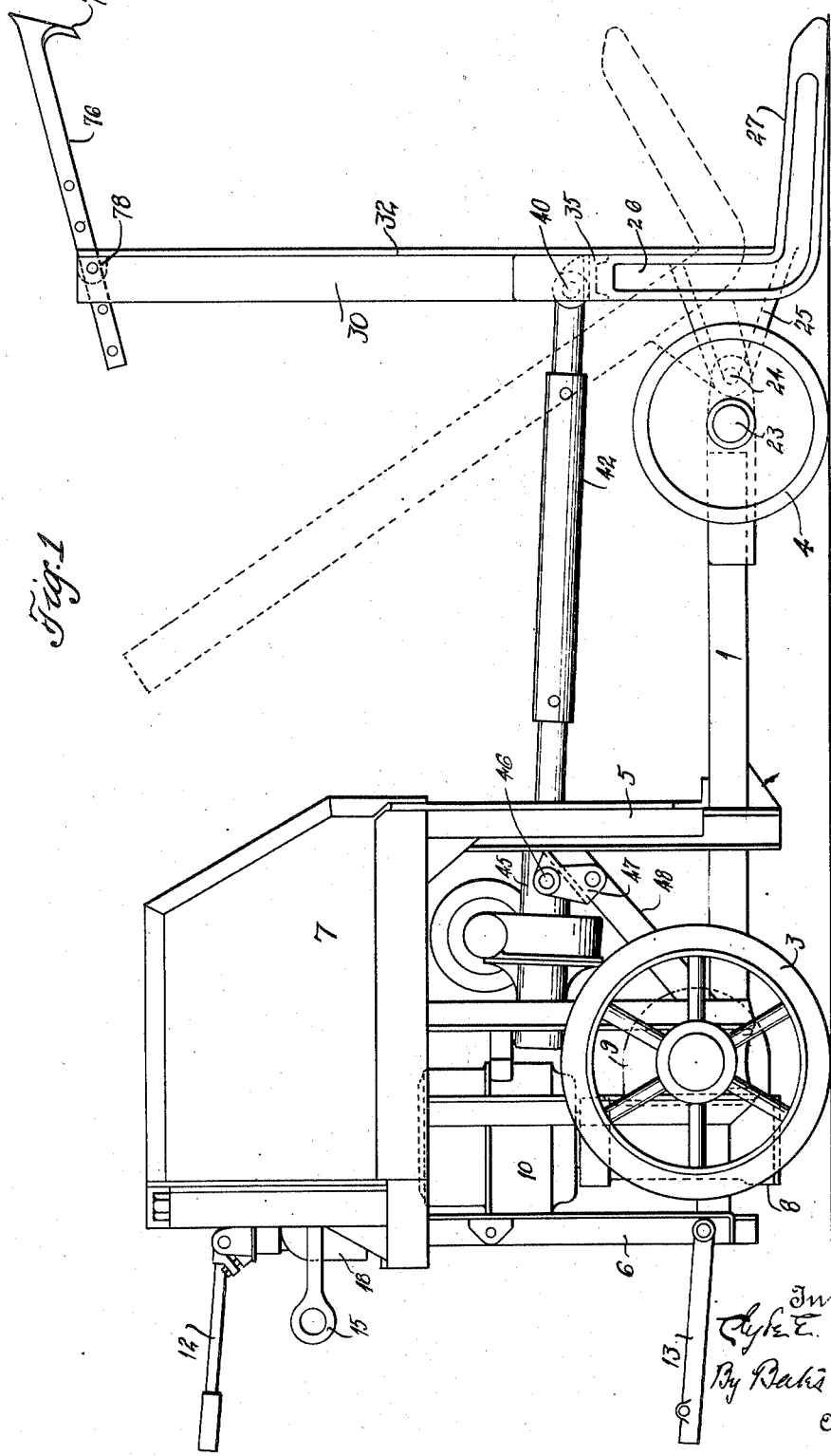

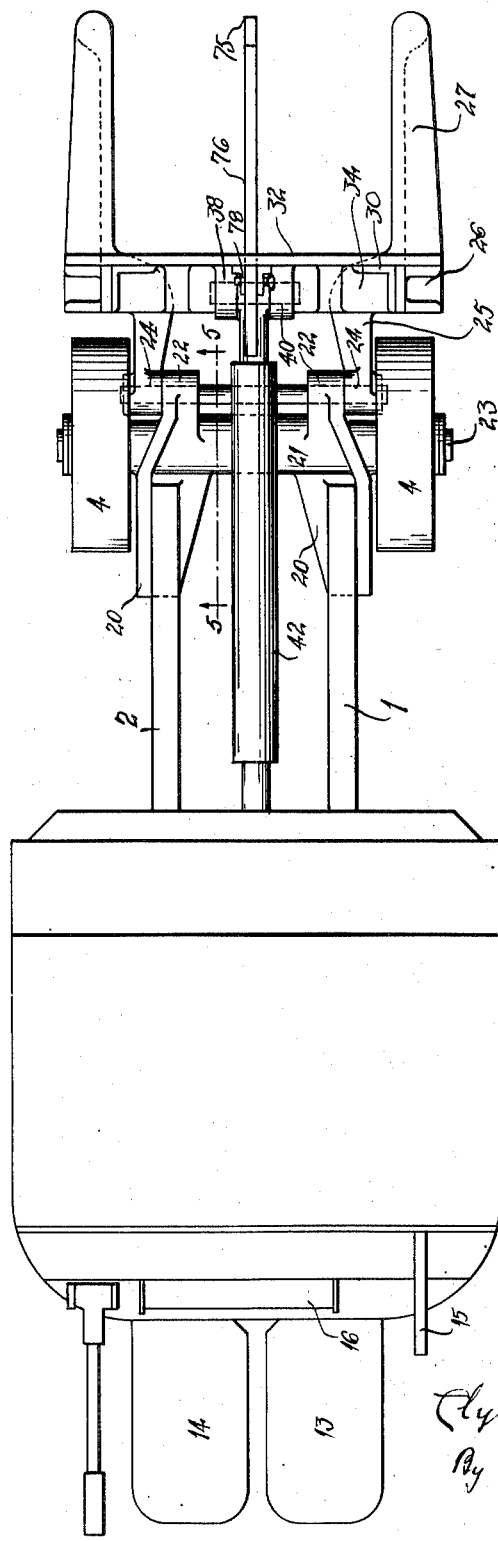

C. E. COCHRAN.
INDUSTRIAL TRUCK.
APPLICATION FILED MAR. 8, 1917.
1,275,849.
Patented Aug. 13, 1918.
3 SHEETS—SHEET 3.
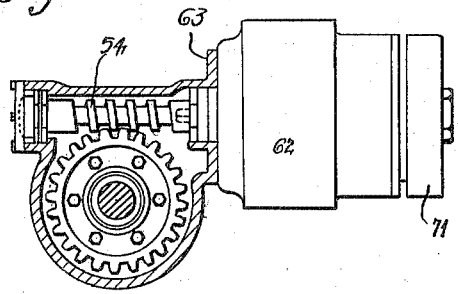
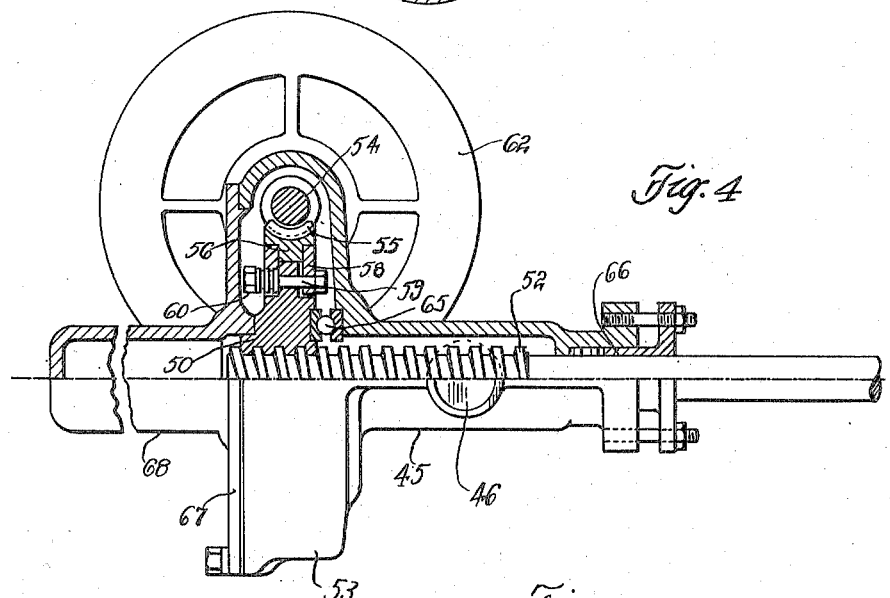
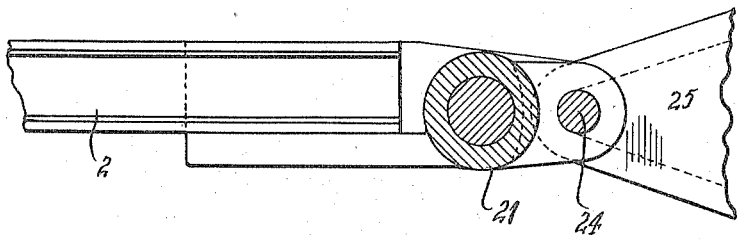
Inventor
Clyde E. Cochran,
By Baker & Macklin,
Attorney

UNITED STATES PATENT OFFICE.

CLYDE E. COCHRAN, OF CLEVELAND, OHIO, ASSIGNOR TO THE ELWELL-PARKER ELECTRIC COMPANY, OF CLEVELAND, OHIO, A CORPORATION OF OHIO.

INDUSTRIAL TRUCK.

1,275,849.   Specification of Letters Patent.   Patented Aug. 13, 1918.

Application filed March 8, 1917. Serial No. 153,374.

*To all whom it may concern:*

Be it known that I, CLYDE E. COCHRAN, a citizen of the United States, residing at Cleveland, in the county of Cuyahoga and State of Ohio, have invented a certain new and useful Improvement in Industrial Trucks, of which the following is a full, clear, and exact description, reference being had to the accompanying drawings.

This invention relates to power-operated trucks such as are commonly used in factories, ware-houses, freight stations and the like. The essential object of this invention is to provide in a motor-driven truck a power-operated carrying support arranged to facilitate the picking up or loading of heavy packages, boxes, bales, bundles and the like, after the manner of two wheeled hand trucks, commonly known as "chisel-wedge hand trucks," as well as being adapted to quickly unload such packages from the support by movement thereof under control of the power-operated device. Additional objects are to so construct the truck that it may be comparatively simple, efficient and rapid in operation, and have no parts liable to get out of order.

My invention is hereinafter more fully described in connection with the accompanying drawings. The essential characteristics are set forth in the claims.

In the drawings, Figure 1 is a side elevation of a power-operated truck equipped with my invention; Fig. 2 is a plan of the same; Fig. 3 is an enlarged sectional detail of the motor driven worm and gear for actuating the support; Fig. 4 is a sectional detail on a still larger scale, the plane of the section being taken on the axis of the operating screw rod and worm nut and transversely of the worm and motor shaft; Fig. 5 is a sectional detail of a connection between the support and the truck frame, the plane of the section being indicated by the line 5—5 of Fig. 2.

Referring briefly to the general construction of the truck shown, which is merely illustrative of any suitable truck equipped with my invention, 1 and 2 indicate longitudinal frame members supported at their forward ends on large wheels 3 and at their rear ends on smaller wheels 4. Rising from the frame members at their forward ends and above the wheels 3 are uprights 5 and 6 carrying a housing 7 which may contain suitable electric batteries. The front wheels 3 may be driven by a motor 10 having a worm and gear connection, in the housings 8 and 9 respectively, for driving the front axle which is preferably so connected with the wheels 3 as to permit swiveling them, whereby the truck may be steered under the control of a suitable steering handle 12. 13 and 14 indicate brake and controller platforms suitably connected with the mechanism of the truck by means, not shown, while 15 indicates a controller lever governing the controller carried in the housing 16, as shown, described and claimed in Patent No. 1,069,991, issued Aug. 12, 1913, to C. E. F. Ahlm and C. E. Cochran.

The frame members 1 and 2 are shown as secured to rearwardly extending brackets 20 of a rear axle housing 21, which embraces the axle 23 and is provided with rearwardly extending bearings 22 carrying a pin 24 on which are pivoted supporting extensions 25 of L-shaped arms, forming the tilting load support.

The members 25 are preferably cast integral with upright legs 26 from which project rearwardly extending legs 27 normally slanted downwardly, as shown in Fig. 1, and preferably tapered substantially to a point to provide for wedging these legs under the package, box or bale, whose edge has been slightly raised to receive them. Secured to the inner sides of the uprights 26 are angle-iron extensions 30, and a cross member, preferably in the nature of a plate 32, may close the space between the uprights and comprise a back or platform for the support.

Extending transversely between the uprights 26 and secured to integral tongues 34, is a bridge member, shown as a channel beam 35, which carries a bracket 38 pivotally connected by a pin 40 with an operating screw rod 42. This rod extends forwardly into a housing 45 pivotally carried by the frame of a truck, the pivotal connection being made by trunnions 46 extending into brackets 47 mounted on braces 48. This housing has an intermediate enlargement for a rotatable nut 50 embracing a threaded portion 52 at the end of the rod and adapted to cause a longitudinal movement thereof when rotated by the worm 54 engaging worm teeth 55 in a ring carried on the periphery of the nut. This ring is shown as driving the nut by friction connection, the ring having an inwardly extending tongue 56 pressed into engagement with a shoulder at one side of the nut by a ring 58 through which extend bolts 59 drawn toward the ring by springs 60. The worm 54 is rigidly connected with the armature shaft of a motor indicated at 62 and carried in a suitable casing rigidly secured to a flange 63 formed on the housing, whereby the motor, worm and screw, may all swing about the pivot 46.

The tilting movement of the support may be quickly stopped in any position by means of an electro-magnetic brake 71, acting on the motor (such as shown and described in my application 130,518, filed November 10, 1916). This brake is designed to be normally set, preventing movement, and is released only when the current is supplied to the motor. Thus the support is very securely held in any position. However, with these parts constructed in the preferred manner, the friction of the nut and screw, and worm and worm-wheel is adequate to prevent movement under a capacity load on the support.

The greater thrust on the nut 50 is preferably received by a ball bearing 65 shown as mounted between the nut and housing, and the entire casing is adapted to be filled with lubricant for the mechanism described. A stuffing box 66 may close the rear end of the housing. The housing 53 for the nut and worm is divided, providing a removable cover 67 carrying a forward extension 68, forming a portion of the screw housing. This cover bears against the forward side of the nut to hold the same in place while receiving the comparatively slight forward thrust of the screw.

At 75 I have shown a hook having a long shank 76 pivoted at 78 to the upright portion of the support and adapted to engage the box or package to be carried by the support, thus providing for lifting very heavy packages in cases where it would be difficult to bring the center of gravity over the support. The shank of this hook is preferably provided with a series of openings through which the pivot pin may extend, or other means, for longitudinal adjustment.

The operation of my invention is as follows: The truck is brought to a package which it is desired to carry with the support in the position shown in solid lines in Fig. 1. The motor 10 is operated to move the truck to thrust the legs 27 beneath the package. The edge of the package may be raised, if desired, or if the nature of the package will permit, the truck may be driven by the motor 10 to forcibly project the lower legs of the support beneath the load. The motor 62 is then operated to rotate the nut in a direction drawing forwardly on the screw rod 42, while at the same time the box or package is thrown forwardly against the support 32 by a comparatively slight effort, or held to the support by the hook shown, or a chain may be brought around the load and made fast to the upper portion of the support. The movement of the support is continued to raise the load, preferably until the center of gravity of the load is above the support, whereupon the propelling mechanism of the truck is started and the load transported to the desired point. Here the load may be readily discharged by merely lowering the support to the position shown in Fig. 1 and moving the truck to withdraw the legs 27.

Having thus described my invention, what I claim is:

1. The combination with a wheeled truck, of a load support having an extension adapted to be thrust beneath the load and having an upright portion for positioning the load, means pivotally attaching the support to the truck frame adjacent to the angle of the two portions of the support, a motor oscillatingly supported, a pull rod pivoted to said support, means rigidly carried by the motor casing for guiding the pull rod, and gearing between the armature and pull rod adapted to move the latter axially.

2. In a truck, the combination of a frame, a tilting support pivotally secured thereto, a screw connected with the support, a nut for the screw, a motor geared with the nut, and an oscillating frame on which the nut and motor are mounted, said oscillating frame being carried by the truck frame.

3. In a truck, the combination of a frame, a tilting support adapted to be projected beneath and pick up a load, a screw connected with the support for causing tilting thereof, a nut for the screw having worm teeth, a motor, a worm meshing with the worm teeth and connected with the armature shaft of the motor, and a pivotally mounted casing carrying the nut worm and motor.

4. The combination with a power-propelled truck, of a load support having an extension adapted to be thrust beneath the load and having upright portions against which the load may be brought by tilting the support, means pivotally attaching the support to the truck frame adjacent to the angle of the two portions of the support, a screw for tilting the support, and power-mechanism for operating the screw.

5. In a truck, the combination of a frame, an axle housing having laterally extending ears, a pivot pin extending through said ears, L-shaped support members having extensions pivoted to said ears, the lower arms of said L-shaped support being adapted to stand adjacent to the ground and to be projected under a load, the upper arms being adapted to position the load when picked up by the support, and transversely extending members connecting the L-shaped members, and mechanism for tilting the support members.

6. The combination of a wheeled truck, an L-shaped load support pivoted adjacent to its angle substantially at one end of the truck, a rod adapted to be pulled to tilt said support, and a nut and screw for operating said rod.

7. The combination of a wheeled truck, an L-shaped load support pivoted adjacent to its angle substantially at one end of the truck, a rod adapted to be pulled to tilt said support, a screw connected with said rod, a rotatable nut for the screw, and a motor for rotating the nut.

In testimony whereof, I hereunto affix my signature.

CLYDE E. COCHRAN.